US011803985B2

(12) United States Patent
Shiraishi

(10) Patent No.: US 11,803,985 B2
(45) Date of Patent: Oct. 31, 2023

(54) INFORMATION PROCESSING APPARATUS, INFORMATION PROCESSING METHOD, AND RECORDING MEDIUM

(71) Applicant: Naoto Shiraishi, Kanagawa (JP)

(72) Inventor: Naoto Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 115 days.

(21) Appl. No.: 17/224,274

(22) Filed: Apr. 7, 2021

(65) Prior Publication Data

US 2021/0335014 A1   Oct. 28, 2021

(30) Foreign Application Priority Data

Apr. 22, 2020   (JP) .................................. 2020-076215

(51) Int. Cl.
*G06T 9/00* (2006.01)
(52) U.S. Cl.
CPC ...................................... *G06T 9/00* (2013.01)
(58) Field of Classification Search
CPC ........................................................ G06T 9/00
USPC ........................................................ 382/246
See application file for complete search history.

(56) References Cited

U.S. PATENT DOCUMENTS

| 2002/0075532 | A1 | 6/2002 | Shiraishi |
| 2003/0053701 | A1 | 3/2003 | Shiraishi |
| 2003/0063813 | A1 | 4/2003 | Shiraishi |
| 2004/0150656 | A1 | 8/2004 | Shiraishi |
| 2005/0151991 | A1 | 7/2005 | Shiraishi |
| 2005/0207667 | A1 | 9/2005 | Shiraishi |
| 2005/0249427 | A1 | 11/2005 | Shiraishi |
| 2006/0193528 | A1 | 8/2006 | Shiraishi |
| 2011/0033125 | A1 | 2/2011 | Shiraishi |
| 2011/0080947 | A1* | 4/2011 | Chen .................... H04N 19/159 375/240.12 |
| 2011/0228325 | A1 | 9/2011 | Shiraishi |
| 2012/0121012 | A1* | 5/2012 | Shiodera ................ H04N 19/60 375/240.03 |
| 2012/0155779 | A1 | 6/2012 | Shiraishi |
| 2013/0094037 | A1 | 4/2013 | Shiraishi |
| 2013/0155466 | A1 | 6/2013 | Shiraishi |
| 2013/0176590 | A1 | 7/2013 | Shiraishi |
| 2014/0139858 | A1 | 5/2014 | Shiraishi |
| 2014/0169480 | A1* | 6/2014 | Lachine ............... H04N 19/176 382/246 |
| 2014/0233067 | A1 | 8/2014 | Shiraishi |
| 2015/0235113 | A1 | 8/2015 | Shiraishi |
| 2016/0277641 | A1 | 9/2016 | Shiraishi |

(Continued)

FOREIGN PATENT DOCUMENTS

| JP | 9-200757 | 7/1997 |
| JP | 2001-111840 | 4/2001 |

(Continued)

*Primary Examiner* — Wednel Cadeau
(74) *Attorney, Agent, or Firm* — IPUSA, PLLC

(57) ABSTRACT

An information processing apparatus includes circuitry to: divide an image into a first block and a second block; encode the first block using fixed-length coding based on a determination that a first data size is equal to or greater than a threshold, the first data size being a data size for the first block in a case where the first block is encoded using variable-length coding; and encode the first block using variable-length coding based on a determination that the first data size is less than the threshold.

15 Claims, 11 Drawing Sheets

(56) References Cited

U.S. PATENT DOCUMENTS

| | | |
|---|---|---|
| 2017/0201643 A1 | 7/2017 | Shiraishi et al. |
| 2018/0255300 A1 | 9/2018 | Shiraishi |
| 2020/0252652 A1 | 8/2020 | Shiraishi |

FOREIGN PATENT DOCUMENTS

| | | |
|---|---|---|
| JP | 2001-224027 | 8/2001 |
| JP | 2002-314818 | 10/2002 |
| JP | 2002-335408 | 11/2002 |

\* cited by examiner

FIG. 7

| CONDITION OF ABSOLUTE VALUE OF DCT COEFFICIENT | HEADER-CODE LENGTH | ADDITIONAL-CODE LENGTH |
|---|---|---|
| 0 | 2 | 0 |
| <2 | 2 | 1 |
| <4 | 2 | 2 |
| <8 | 3 | 3 |
| <16 | 4 | 4 |
| <32 | 5 | 5 |
| <64 | 6 | 6 |
| <128 | 7 | 7 |
| <256 | 8 | 8 |
| <512 | 9 | 9 |
| <1024 | 10 | 10 |

FIG. 9

| CONDITION OF ABSOLUTE VALUE OF DCT COEFFICIENT | DCT COEFFICIENT TYPE | HEADER CODE | ADDITIONAL CODE |
|---|---|---|---|
| 0 | 0 | 2'00 | NO CODE |
| <2 | 1 | 2'01 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 1 |
| <4 | 2 | 2'10 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 3 |
| <8 | 3 | 3'110 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 7 |
| <16 | 4 | 4'1110 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 15 |
| <32 | 5 | 5'11110 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 31 |
| <64 | 6 | 6'111110 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 63 |
| <128 | 7 | 7'1111110 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 127 |
| <256 | 8 | 8'11111110 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 255 |
| <512 | 9 | 9'111111110 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 511 |
| <1024 | 10 | 10'1111111110 | IF VALUE OF DCT COEFFICIENT IS POSITIVE NUMBER: VALUE OF DCT COEFFICIENT<br>IF VALUE OF DCT COEFFICIENT IS NEGATIVE NUMBER: VALUE OF DCT COEFFICIENT + 1023 |

FIG. 11

| HEADER | DCT COEFFICIENT TYPE | HEADER-CODE LENGTH | ADDITIONAL-CODE LENGTH | THRESHOLD FOR ADDITIONAL-CODE NEGATIVE NUMBER | ADDITIONAL-CODE SUBTRACTION VALUE |
|---|---|---|---|---|---|
| 10'b00XXXXXXXX | 0 | 2 | 0 | 0 | 0 |
| 10'b01XXXXXXXX | 1 | 2 | 1 | 1 | 1 |
| 10'b10XXXXXXXX | 2 | 2 | 2 | 2 | 3 |
| 10'b110XXXXXXX | 3 | 3 | 3 | 4 | 7 |
| 10'b1110XXXXXX | 4 | 4 | 4 | 8 | 15 |
| 10'b11110XXXXX | 5 | 5 | 5 | 16 | 31 |
| 10'b111110XXXX | 6 | 6 | 6 | 32 | 63 |
| 10'b1111110XXX | 7 | 7 | 7 | 64 | 127 |
| 10'b11111110XX | 8 | 8 | 8 | 128 | 255 |
| 10'b111111110X | 9 | 9 | 9 | 256 | 511 |
| 10'b1111111110 | 10 | 10 | 10 | 512 | 1023 | ial
INFORMATION PROCESSING APPARATUS, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2020-076215, filed on Apr. 22, 2020, in the Japan Patent Office, the entire disclosure of which is hereby incorporated by reference herein.

BACKGROUND

Technical Field

The present disclosure relates to an information processing apparatus, an information processing method, and a recording medium.

Description of the Related Art

A technique for encoding (compressing) an image, storing the encoded (compressed) image, and decoding the image when outputting (displaying or printing) the image is known in the related art. A fixed-length encoding method is known as a method for encoding an image. In the fixed-length encoding method, codes to be assigned are fixed in length.

In the related art, however, for example, an image obtained by decoding an encoded image may have unsatisfactory quality.

SUMMARY

According to an embodiment of the present disclosure, an information processing apparatus includes circuitry configured to divide an image into a first block and a second block; encode the first block using fixed-length coding based on a determination that a first data size is equal to or greater than a threshold, the first data size being a data size for the first block in a case where the first block is encoded using variable-length coding; and encode the first block using variable-length coding based on a determination that the first data size is less than the threshold.

According to another embodiment of the present disclosure, an information processing method performed by an information processing apparatus includes dividing an image into a first block and a second block; determining whether a first data size is equal to or greater than a threshold, the first data size being a data size for the first block in a case where the first block is encoded using variable-length coding; encoding the first block using fixed-length coding based on a determination that the first data size is equal to or greater than the threshold; and encoding the first block using variable-length coding based on a determination that the first data size is less than the threshold.

According to another embodiment of the present disclosure, a non-transitory recording medium storing a plurality of instructions which, when executed by one or more processors, cause the processors to perform the above-described image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a diagram illustrating an example of code length correspondence data for variable-length codes according to the embodiment;

FIG. 9 is a diagram illustrating an example of encoding correspondence data for variable-length codes according to the embodiment;

FIG. 11 is a diagram illustrating an example of decoding correspondence data for variable-length codes according to the embodiment.

Figure 1:
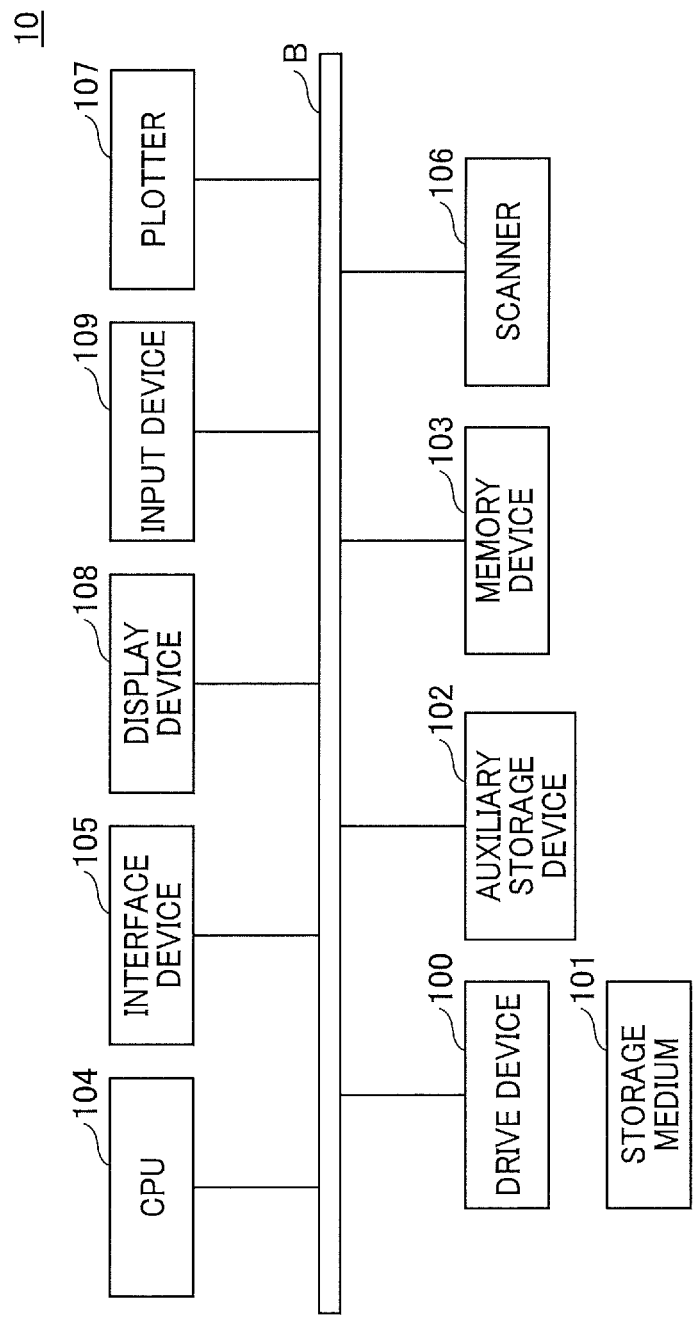
FIG. 1 is a diagram illustrating an example hardware configuration of an information processing apparatus according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment will be described with reference to the drawings. An information processing apparatus 10 according to the embodiment may be, for example, an image forming apparatus such as a multifunction peripheral/product/printer (MFP) having a copy function, a scanner function, and other suitable functions. In this case, for example, the information processing apparatus 10 may read a document specified by a user with a scanner, encode a read image, record (store or accumulate) the encoded image, and print recorded document data in accordance with an instruction given from the user.

In some embodiments, examples of the information processing apparatus 10 may include an electronic whiteboard, a computer such as a smartphone, a tablet terminal, or a server, a video conference device, a head up display (HUD) device, an industrial machine, a medical device, a home appliance, an automobile, a personal computer (PC), and a game console.

Hardware Configuration

FIG. 1 is a diagram illustrating an example hardware configuration of the information processing apparatus 10 according to the embodiment. FIG. 1 illustrates an example hardware configuration of the information processing apparatus 10, which is a multifunction peripheral/product/printer. In the example illustrated in FIG. 1, the information processing apparatus 10 includes a drive device 100, an auxiliary storage device 102, a memory device 103, a central processing unit (CPU) 104, an interface device 105, a scanner 106, a plotter 107, a display device 108, and an input device 109, which are interconnected by a bus B.

A program (information processing program) that implements processing performed by the information processing apparatus 10 may be provided by a recording medium 101. In this case, in response to the recording medium 101, which stores the program, being set in the drive device 100, the program may be installed into the auxiliary storage device 102 from the recording medium 101 through the drive device 100. For example, the program may be downloaded to the information processing apparatus 10 from any other computer via a network and installed into the information processing apparatus 10.

The auxiliary storage device 102 stores the installed program and also stores desired files, data, and so on. Examples of the auxiliary storage device 102 may include a hard disk drive (HDD) and a solid state drive (SSD).

In response to an instruction to activate the program, the memory device 103 reads the program from the auxiliary storage device 102 and stores the read program. The CPU 104 implements the functions of the information processing apparatus 10 in accordance with the program stored in memory device 103. The interface device 105 is used as an interface for connecting to the network.

The scanner 106 is a device that reads an image. The plotter 107 is a device that prints an image. The display device 108 is a device that displays a graphical user interface (GUI) and other information produced by the program. Examples of the display device 108 may include a liquid crystal display and a touch panel. The input device 109 accepts input of various operation instructions. Examples of the input device 109 may include a button and a touch panel.

Examples of the recording medium 101 include portable recording media such as a compact disc read-only memory (CD-ROM), a digital versatile disc (DVD), and a Universal Serial Bus (USB) memory. Examples of the auxiliary storage device 102 include an HDD and a flash memory. The recording medium 101 and the auxiliary storage device 102 correspond to a computer-readable recording medium.

Functional Configuration

Figure 2:
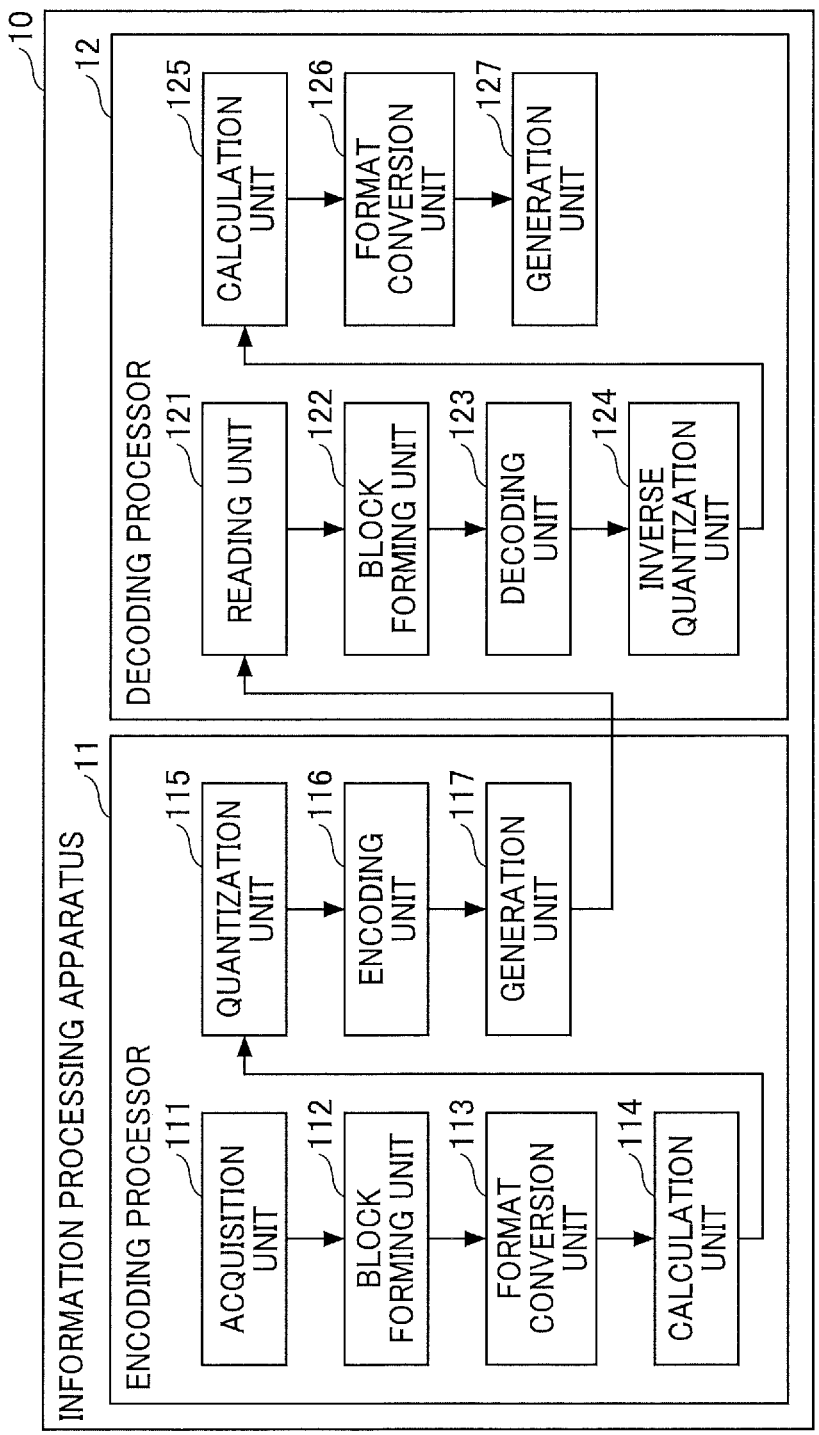
FIG. 2 is a diagram illustrating an example functional configuration of the information processing apparatus according to the embodiment.

Next, the functional configuration of the information processing apparatus 10 according to the embodiment will be described with reference to FIG. 2. FIG. 2 is a diagram illustrating an example functional configuration of the information processing apparatus 10 according to the embodiment. The information processing apparatus 10 includes an encoding processor 11 and a decoding processor 12. Individual function units of the information processing apparatus 10 may be implemented by cooperation between one or more programs installed in the information processing apparatus 10 and the CPU 104 or the like of the information processing apparatus 10. Individual function units of the information processing apparatus 10 may be implemented by, for example, one or more processing circuits. As used herein, the term "processing circuit" is used to include a processor that executes individual functions by means of software, such as a processor implemented by an electronic circuit, and devices designed to execute the processing of individual function units, such as an application specific integrated circuit (ASIC), a digital signal processor (DSP), a field programmable gate array (FPGA), and an existing circuit module.

The encoding processor 11 encodes image data. The encoding processor 11 includes an acquisition unit 111, a block forming unit 112, a format conversion unit 113, a calculation unit 114, a quantization unit 115, an encoding unit 116, and a generation unit 117.

The acquisition unit 111 acquires an image. The block forming unit 112 divides the image acquired by the acquisition unit 111 into blocks. The format conversion unit 113 converts the format of pixel values of each of the blocks formed by the block forming unit 112. The calculation unit 114 performs a frequency transform of the pixel values whose format is converted by the format conversion unit 113, and calculates coefficients in the frequency domain.

The quantization unit 115 quantizes the coefficients calculated by the calculation unit 114. The encoding unit 116 encodes the coefficients quantized by the quantization unit 115 using fixed-length coding or variable-length coding.

The generation unit 117 generates, based on the data of the blocks encoded by the encoding unit 116, encoded data of the image acquired by the acquisition unit 111.

The decoding processor 12 decodes the image data encoded by the encoding processor 11. The decoding processor 12 includes a reading unit 121, a block forming unit 122, a decoding unit 123, an inverse quantization unit 124, a calculation unit 125, a format conversion unit 126, and a generation unit 127.

The reading unit 121 reads the encoded data of the image generated by the generation unit 117 of the encoding processor 11.

The block forming unit 122 decomposes the encoded data of the image read by the reading unit 121 into encoded data of blocks.

The decoding unit 123 decodes the decomposed encoded data of the blocks, which is obtained by the block forming unit 122, using fixed-length coding or variable-length coding.

The inverse quantization unit 124 inverse-quantizes the data of the blocks decoded by the decoding unit 123. The calculation unit 125 performs an inverse transform (inverse frequency transform) of the coefficients of the blocks in the frequency domain, which are inverse-quantized by the inverse quantization unit 124, and calculates respective pixel values.

The format conversion unit 126 converts the format of the pixel values of the blocks calculated by the calculation unit 125. The generation unit 127 generates image data, based on the pixel values of the blocks whose format is converted by the format conversion unit 126.

Encoding Process

Figure 3:
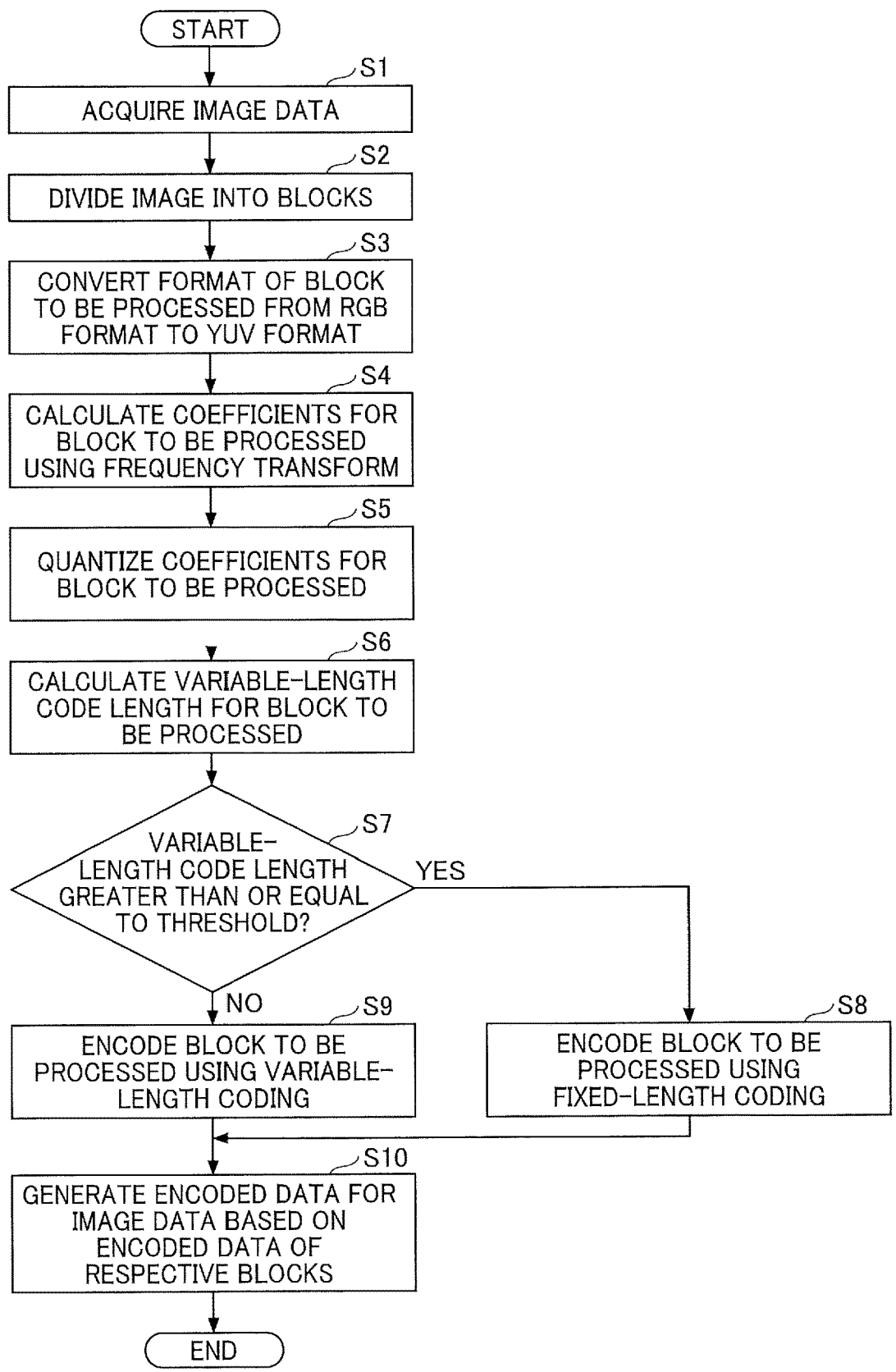
FIG. 3 is a flowchart illustrating an example encoding process executed by an encoding processor according to the embodiment.
Figure 4:
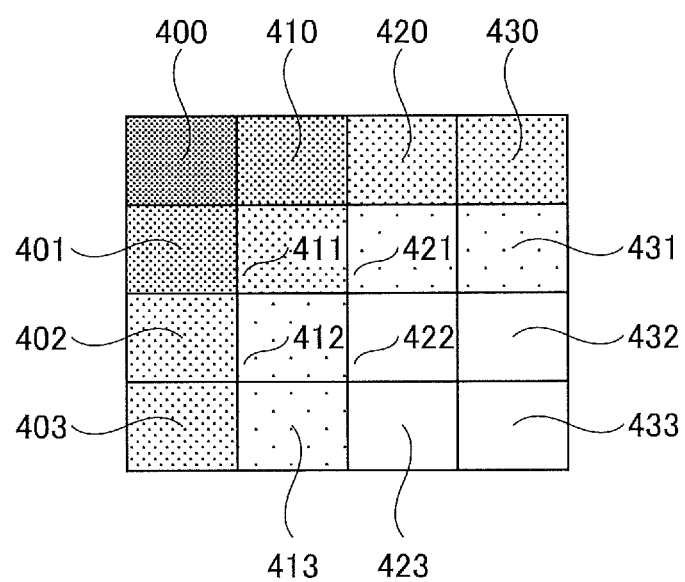
FIG. 4 is a diagram illustrating an example quantization limiter for discrete cosine transform (DCT) coefficients of image data of blocks according to the embodiment.
Figure 5:
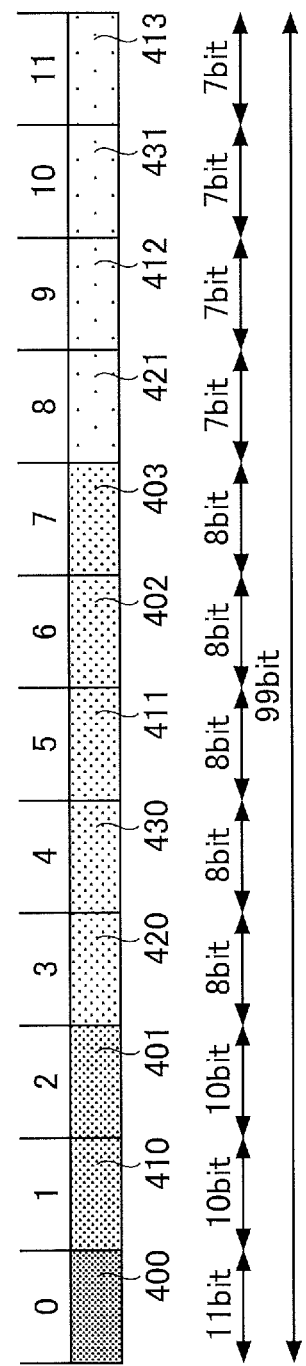
FIG. 5 is a diagram illustrating an example fixed-length encoding process of DCT coefficients for a luminance signal (Y) according to the embodiment.
Figure 6A:
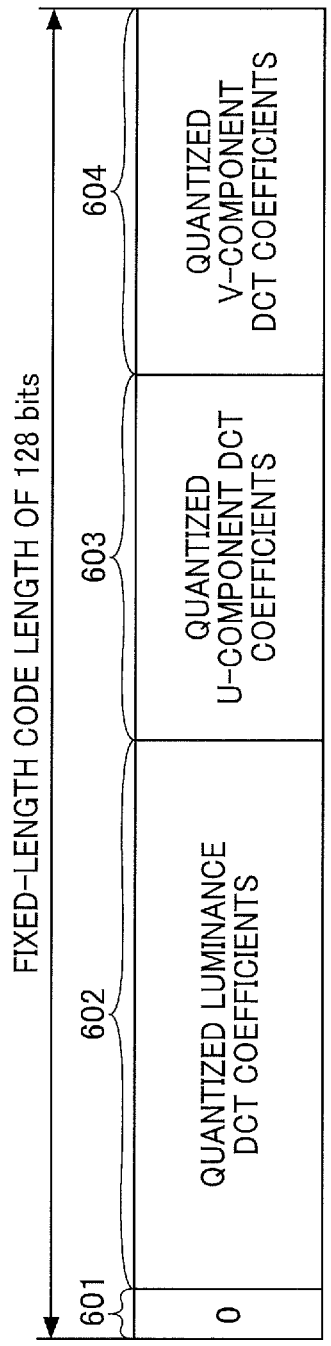
FIGS. 6A and 6B are diagrams illustrating examples of encoded data for a block to be processed according to the embodiment.
Figure 6B:
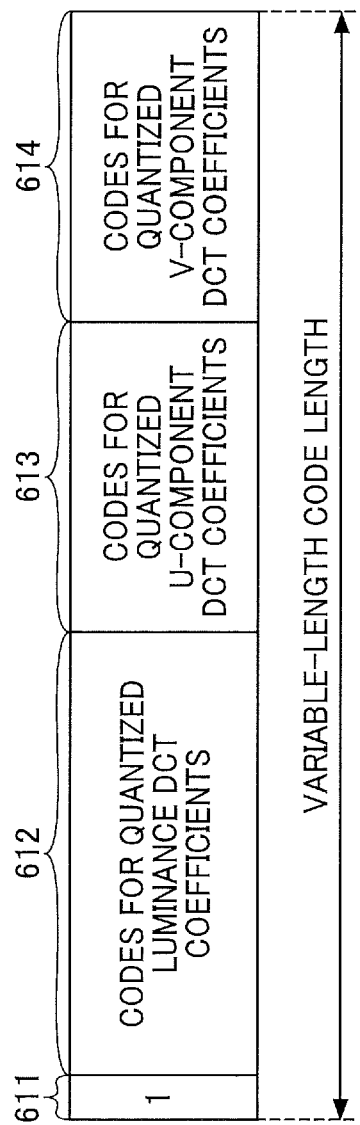

Next, an example encoding process executed by the encoding processor 11 according to the embodiment will be described with reference to FIGS. 3 to 6B. FIG. 3 is a flowchart illustrating an example encoding process executed by the encoding processor 11 according to the embodiment. FIG. 4 is a diagram illustrating an example of quantization of discrete cosine transform (DCT) coefficients of image data of blocks according to the embodiment. FIG. 5 is a diagram illustrating an example fixed-length encoding process of DCT coefficients for a luminance signal (Y) according to the embodiment. FIGS. 6A and 6B are diagrams illustrating examples of encoded data for a block to be processed according to the embodiment.

In step S1, the acquisition unit 111 acquires image data. For example, the acquisition unit 111 acquires image data read by a scanner, image data transmitted from an external device, image data obtained by a camera, and the like.

Then, the block forming unit 112 divides the image into blocks (to form blocks) (step S2). In one example, the block forming unit 112 divides the image into blocks of a predetermined size (M×N pixels). The predetermined size may be, for example, 4×4 pixels (four pixels in both height and width) or the like.

The processing of steps S3 to S9 is executed on each of the blocks of the image. In the following, one of the blocks of the image is referred to as the "block to be processed".

Then, the format conversion unit 113 converts the format of the block to be processed from an RGB format to a YUV format (step S3). The RGB format represents a color as a combination of the three primary colors of light, namely, red, green, and blue. The YUV format represents a color as a combination of the luminance signal (Y), the difference (U) between the luminance signal and the blue component, and the difference (V) between the luminance signal and the red component.

Then, the calculation unit 114 performs a frequency transform of the block to be processed, whose format is converted into the YUV format, and calculates the coefficients of the frequency components (step S4). The calculation unit 114 may calculate the coefficients of the frequency components using, for example, a discrete cosine transform (DCT). Alternatively, the calculation unit 114 may calculate the coefficients of the frequency components using, for example, a frequency transform such as a discrete wavelet transform (DWT). In the following, a description will be given of an example in which a DCT is used.

For example, the calculation unit 114 may calculate a DCT coefficient F(i, j) for a pixel value f(x, y) in a block of M×N pixels to be processed in accordance with Equation (1) below. The value i is any one of 0, 1, . . . , and M−1 (i=0, 1, . . . , M−1), and the value j is any one of 0, 1, . . . , and N−1 (j=0, 1, . . . , N−1).

$$F(i, j) = C(i)C(j) \sum_{x=0}^{M-1} \sum_{y=0}^{N-1} f(x, y) \cos\left[\frac{(2x+1)i\pi}{2M}\right] \cos\left[\frac{(2y+1)j\pi}{2N}\right] \quad (1)$$

where C(p) is expressed by Equation (2) below.

$$C(p) = \begin{cases} 1/\sqrt{2} & (p = 0) \\ 1 & (p \neq 0) \end{cases} \quad (2)$$

Then, the quantization unit 115 quantizes a coefficient calculated by the calculation unit 114 for the block to be processed (step S5). For example, the quantization unit 115 converts a coefficient calculated by the calculation unit 114 into an approximate value of a preset discrete level. In this case, for example, the quantization unit 115 may divide a coefficient calculated by the calculation unit 114 by a step size corresponding to a preset number of quantization bits and then convert the result into an integer by rounding or the like.

In this case, for example, the quantization unit 115 may quantize each DCT coefficient F(i, j) with the number of quantization bits corresponding to the values i and j indicating components of the DCT coefficient.

FIG. 4 illustrates an example of the numbers of quantization bits for respective DCT coefficients F(i, j) for the luminance signal (Y) in a block of 4×4 pixels. In the example illustrated in FIG. 4, the DCT coefficient F(0, 0) 400 is a direct current (DC) component, and the largest number of first quantization bits (for example, 11 bits) is set for the DCT coefficient F(0, 0) 400.

The DCT coefficients F(1, 0) 410 and F(0, 1) 401 are alternating current (AC) components and horizontal and vertical DCT coefficients with the lowest frequency, respectively, and are each assigned the second largest number of second quantization bits (for example, 10 bits).

The DCT coefficients F(2, 0) 420, F(3, 0) 430, F(1, 1) 411, F(0, 2) 402, and F(0, 3) 403 are AC components representing waveforms with relatively low frequencies and are each assigned the number of third quantization bits, whose absolute value is the third largest (for example, 8 bits).

The DCT coefficients F(2, 1) 421, F(3, 1) 431, F(1, 2) 412, and F(1, 3) 413 are AC components representing waveforms with relatively high frequencies and are each assigned the number of fourth quantization bits, whose absolute value is the fourth largest (for example, 7 bits).

The DCT coefficients F(2, 2) 422, F(3, 2) 432, F(2, 3) 423, and F(3, 3) 433 represent high-frequency waveforms and are not to be encoded (are not included in the data to be encoded). As a result, the respective DCT coefficients F(i, j) can be quantized so that the total data size of the pieces of data of the DCT coefficients F(i, j) becomes equal to a predetermined size (for example, 99 bits), regardless of the value of each of the DCT coefficients F(i, j).

The quantization unit 115 may quantize each DCT coefficient F(i, j), for the difference (U) between the luminance signal and the blue component and the difference (V) between the luminance signal and the red component, using the number of quantization bits that is smaller than the number of quantization bits for the DCT coefficient F(i, j) for the luminance signal (Y).

Then, the encoding unit 116 calculates the data size (variable-length code length) of data obtained by encoding the block to be processed using variable-length coding (step S6). The encoding unit 116 calculates a variable-length code length for the block to be processed in a case where the block to be processed is encoded using variable-length coding in the processing of step S9 described below.

Variable-length coding is an encoding method in which codes to be assigned are variable in length. In variable-length coding, a value less likely to occur is assigned a long bit string, and a value more likely to occur is assigned a short bit string to compress the data size. The encoding unit 116 may use, for example, Huffman coding as variable-length coding. In variable-length coding, since a long bit string is assigned to a value less likely to occur, DCT coefficients F(i, j) including a value less likely to occur may increase (expand) the data size.

For example, the encoding unit 116 may calculate a variable-length code length for the block to be processed in accordance with preset information on a correspondence between a condition of the absolute value of a DCT coefficient and a combination of a header-code length and an additional-code length, as illustrated in FIG. 7. In the example illustrated in FIG. 7, for example, for a DCT coefficient whose absolute value is greater than or equal to 2 and less than 4, the header-code length is 2 bits, and the additional-code length is 2 bits. For example, for a DCT coefficient whose absolute value is greater than or equal to 512 and less than 1024, the header-code length is 10 bits, and the additional-code length is 10 bits.

In this case, for example, the encoding unit 116 calculates the sum of the value of the header-code length and the value of the additional-code length for each DCT coefficient for the block to be processed. Then, for example, the encoding unit 116 sets the sum of the value of the header-code length and the value of the additional-code length for each DCT coefficient as the variable-length code length for the block to be processed.

In step S6, instead of step S9, the encoding unit 116 may execute a process for encoding the block to be processed using variable-length coding and set the data size, which is obtained as a result of the process, as the variable-length code length.

Then, the encoding unit 116 determines whether the data size (variable-length code length) for the block to be processed in a case where the block to be processed is encoded using variable-length coding is greater than or equal to a threshold (step S7). The threshold may be determined based on, for example, the data size (fixed-length code length) for the block to be processed in a case where the block to be processed is encoded using fixed-length coding. In this case, the fixed-length code length for the block to be processed may be used as the threshold.

If the variable-length code length is greater than or equal to the threshold (YES in step S7), the encoding unit 116 encodes the block to be processed using fixed-length coding (step S8). Then, the process proceeds to step S10. As a result, if the variable-length code length is larger than the fixed-length code length or the like because, for example, the DCT coefficients F(i, j) include a value less likely to occur, the block to be processed can be encoded using fixed-length coding.

The encoding unit 116 encodes the coefficients quantized by the quantization unit 115 using fixed-length coding. In the example illustrated in FIG. 5, the encoding unit 116 rearranges the quantized values of the respective DCT coefficients F(i, j) for the luminance signal (Y) according to a predefined order (luminance DCT code format) to generate 99-bit data of a fixed length. In the example illustrated in FIG. 5, the DCT coefficients F(0, 0) 400, F(1, 0) 410, F(0, 1) 401, F(2, 0) 420, F(3, 0) 430, F(1, 1) 411, and F(0, 2) 402 are arranged in this order. For the difference (U) between the luminance signal and the blue component and the difference (V) between the luminance signal and the red component, the encoding unit 116 also rearranges the quantized values of the respective coefficients in a manner similar to those for the luminance signal (Y) to generate data of a fixed length.

On the other hand, if the variable-length code length is not greater than or equal to the threshold (NO in step S7), the encoding unit 116 encodes the block to be processed using variable-length coding (step S9). The encoding unit 116 encodes the coefficients quantized by the quantization unit 115 using variable-length coding. For example, the encoding unit 116 may use known variable-length coding for use in Joint Photographic Experts Group (JPEG) or the like. The encoding unit 116 encodes the respective coefficients for each of the luminance signal (Y), the difference (U) between the luminance signal and the blue component, and the difference (V) between the luminance signal and the red component using variable-length coding.

In the processing of steps S8 and S9, data obtained by quantizing the coefficients for the block to be processed in the processing of step S5 is encoded (losslessly compressed) so that the data can be completely restored to its original form. Thus, the image quality of the respective blocks when decoded is the same as that of the original image.

Then, the generation unit 117 combines pieces of encoded data obtained by encoding the respective blocks of the image into a single file to generate encoded data for the image data (step S10). Then, the process ends. The encoded data for the image data may be recorded in an internal or external storage device of the information processing apparatus 10.

In the example illustrated in FIGS. 6A and 6B, examples of encoded data for the block to be processed are illustrated. FIG. 6A illustrates an example of data obtained by encoding the block to be processed using fixed-length coding. In the example illustrated in FIG. 6A, the block to be processed is encoded into 128-bit data of a fixed length including a 1-bit identification signal 601 indicating that the block is encoded using fixed-length coding, DCT coefficients 602 for the luminance signal (Y), DCT coefficients 603 for the difference (U) between the luminance signal and the blue component, and DCT coefficients 604 for the difference (V) between the luminance signal and the red component.

FIG. 6B illustrates an example of data obtained by encoding the block to be processed using variable-length coding. In the example illustrated in FIG. 6B, the block to be processed is encoded into data of a variable length including a 1-bit identification signal 611 indicating that the block is encoded using variable-length coding, DCT coefficients 612 for the luminance signal (Y), DCT coefficients 613 for the difference (U) between the luminance signal and the blue component, and DCT coefficients 614 for the difference (V) between the luminance signal and the red component.

Process for Generating Data Encoded Using Variable-Length Coding

Figure 8:
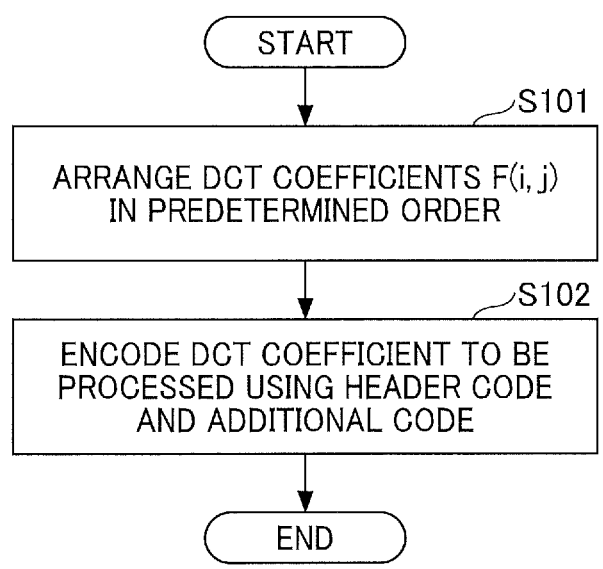
FIG. 8 is a flowchart illustrating an example process for encoding the block to be processed using variable-length coding.

An example process for encoding the block to be processed using variable-length coding in step S9 in FIG. 3 will be described with reference to FIGS. 8 and 9. FIG. 8 is a flowchart illustrating an example process for encoding the block to be processed using variable-length coding. FIG. 9 is a diagram illustrating an example of encoding correspondence data for variable-length codes according to the embodiment.

In step S101, the encoding unit 116 arranges the DCT coefficients F(i, j) for the block to be processed in a predetermined order. The encoding unit 116 may encode the DCT coefficients for the block to be processed using variable-length coding so that the DCT coefficients can be arranged in the same order as that when the DCT coefficients are encoded using fixed-length coding illustrated in FIG. 5.

In the following, one of the DCT coefficients for the block to be processed is referred to as the "DCT coefficient to be processed". The following process is executed on each of the DCT coefficients for the block to be processed.

Then, the encoding unit 116 encodes the DCT coefficient to be processed using a header code and an additional code (step S102). For example, the encoding unit 116 may determine the header code and the additional code by using a preset correspondence illustrated in FIG. 9 between a condition of the absolute value of a DCT coefficient for luminance and a header code and an additional code of a variable-length code. In the example illustrated in FIG. 9, the encoding unit 116 determines, in order from top to bottom, whether the condition of the absolute value of the DCT coefficient to be processed is satisfied. If a condition is satisfied, the encoding unit 116 determines the header code and the additional code corresponding to the condition.

In the example illustrated in FIG. 9, for example, in a case where the absolute value of the DCT coefficient to be processed is greater than or equal to 2 and less than 4 (DCT coefficient type is 2), the header code is defined as 2'b10 (in two-digit binary number whose value is 10). Note that N'b specifies an N-digit binary notation.

In a case where the DCT coefficient type is 2, the value of the DCT coefficient to be processed is set as the additional code if the DCT coefficient to be processed is a positive number, and the value obtained by adding 3 to the value of the DCT coefficient to be processed is set as the additional code if the DCT coefficient to be processed is a negative number.

In the example illustrated in FIG. 9, in a case where the DCT coefficient type is 2, a DCT coefficient of −1, 0, or 1 is excluded by the conditions that the DCT coefficient type is 0 and 1. Thus, the DCT coefficient is −3, −2, 2, or 3. If the value of the DCT coefficient is a positive number, the value of the DCT coefficient is set as the additional code, and if the value of the DCT coefficient is a negative number, the value obtained by adding 3 to the value of the DCT coefficient is set as the additional code. If the DCT coefficient type is 2, accordingly, the value of the additional code is 0, 1, 2, or 3, and the additional code is encoded with 2 bits.

Decoding Process

Figure 10:
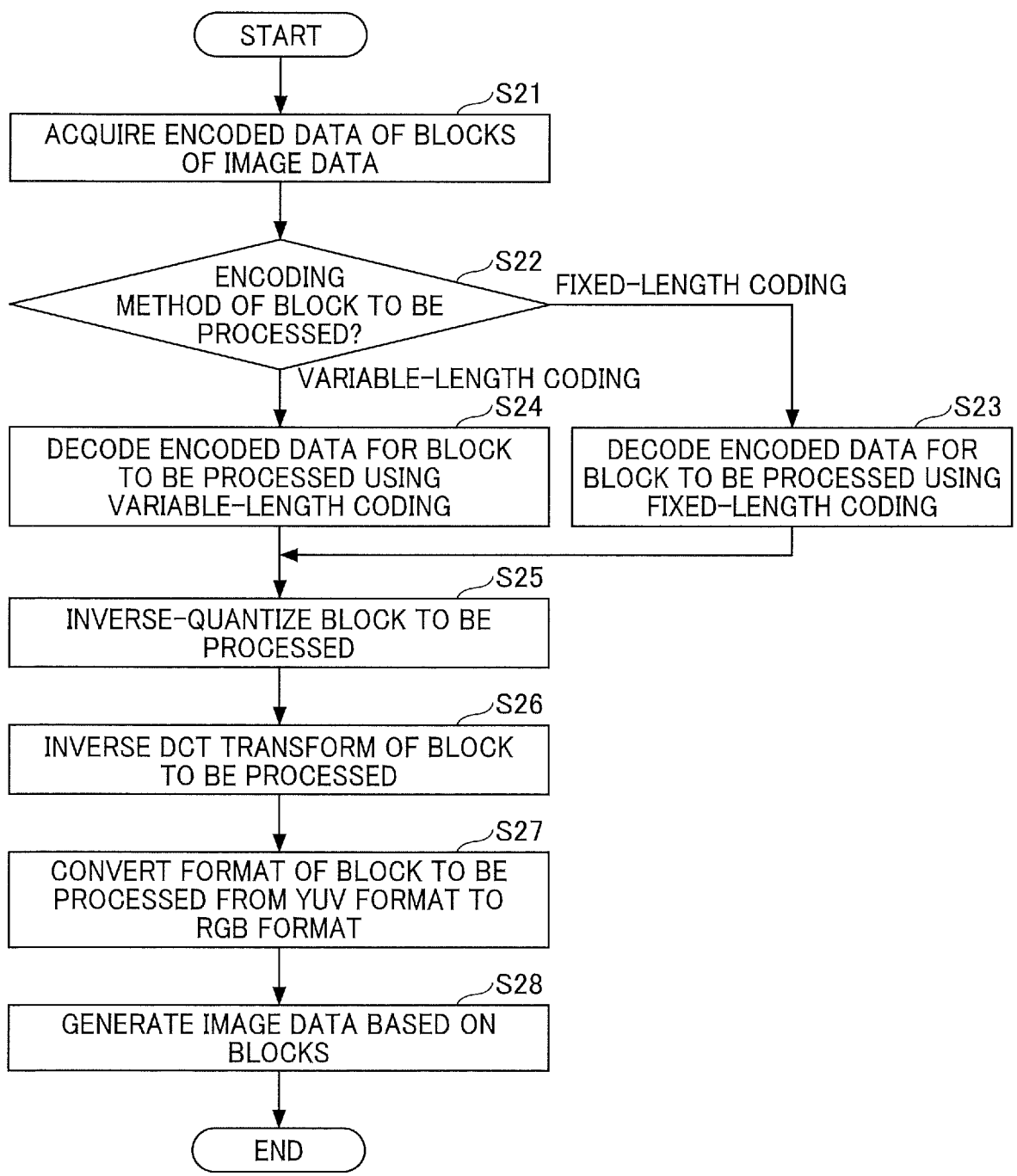
FIG. 10 is a flowchart illustrating an example decoding process executed by a decoding processor according to the embodiment.

Next, an example decoding process executed by the decoding processor 12 according to the embodiment will be described with reference to FIG. 10. FIG. 10 is a flowchart illustrating an example decoding process executed by the decoding processor 12 according to the embodiment. FIG. 11 is a diagram illustrating an example of decoding correspondence data for variable-length codes according to the embodiment.

In step S21, the reading unit 121 reads (acquires) image data encoded by the encoding processor 11. For example, the reading unit 121 may receive data encoded by another information processing apparatus 10 via a network and read the received data. For example, the reading unit 121 may read data recorded in an internal or external storage device of the information processing apparatus 10 by the generation unit 117 of the encoding processor 11.

Then, the block forming unit 122 decomposes the data read by the reading unit 121 into encoded data of blocks of the image (step S22).

The processing of steps S23 to S27 described below is executed on each of the blocks of the image. In the following, one of the blocks of the image is referred to as the "block to be processed".

In step S22, the decoding unit 123 determines whether the block to be processed has been encoded using fixed-length coding or variable-length coding. The decoding unit 123 may determine whether the block to be processed has been encoded using fixed-length coding or variable-length coding, based on 1 bit at the beginning of the encoded data for the block to be processed, as specified in the identification signal 601 and the identification signal 611 illustrated in FIGS. 6A and 6B.

If the block to be processed has been encoded using fixed-length coding (fixed-length coding in step S22), the decoding unit 123 decodes the encoded data using fixed-length coding (step S23). Then, the process proceeds to step S25.

On the other hand, if the block to be processed has been encoded using variable-length coding (variable-length coding in step S22), the decoding unit 123 decodes the encoded data using variable-length coding (step S24). The decoding unit 123 decodes the value of the DCT coefficient from the additional code, based on the value of the header code.

In this case, as illustrated in FIG. 11, the decoding unit 123 determines the header-code length and the additional-code length, based on the value of the header code, and extracts the data of the additional code. Then, the decoding unit 123 determines whether the value of the additional code is less than or equal to a threshold (threshold for an additional-code negative number) corresponding to the value of the header code. If the value of the additional code is not less than or equal to the threshold, the decoding unit 123 sets the value of the additional code as the value of the DCT coefficient.

On the other hand, if the value of the additional code is less than or equal to the threshold, the decoding unit 123 sets, as the value of the DCT coefficient, a value obtained by subtracting a predetermined value (additional-code subtraction value) corresponding to the value of the header code from the value of the additional code. Accordingly, the value of the DCT coefficient is decoded in a case where the value of the DCT coefficient is a negative number.

In the example illustrated in FIG. 11, for example, when 10 bits from the beginning of the encoded data are 10'b10XXXXXXXX (X is 0 or 1) (when the header code is 2'b10), the decoding unit 123 determines that the additional-code length is 2 bits. If the value of the additional code is smaller than 2, the decoding unit 123 sets, as the value of the DCT coefficient, a value obtained by subtracting 3 from the value of the additional code.

Then, the inverse quantization unit 124 inverse-quantizes (step S25) the DCT coefficients F(i, j) for the block to be processed, which are decoded by the decoding unit 123. For example, the inverse quantization unit 124 may inverse-quantize each DCT coefficient F(i, j) by multiplying the step size corresponding to i and j indicating components of the DCT coefficient. The step size may be set in the information processing apparatus 10 in advance or may be received from the encoding processor 11.

Then, the calculation unit 125 performs an inverse DCT transform of the inverse-quantized DCT coefficients F(i, j) (step S26). For example, the calculation unit 125 may calculate the pixel values f(x, y) from the DCT coefficients F(i, j) for pixel values f(x, y) of a block of M×N pixels to be processed in accordance with Equation (3) below.

$$f(x, y) = \frac{4}{MN} \sum_{i=0}^{M-1} \sum_{j=0}^{N-1} C(i)C(j)F(i, j)\cos\left[\frac{(2x+1)i\pi}{2M}\right]\cos\left[\frac{(2y+1)j\pi}{2N}\right] \quad (3)$$

Then, the format conversion unit 126 converts the format of the image data of the block to be processed, which is subjected to an inverse DCT transform, from the YUV format to the RGB format (step S27). Then, the generation unit 127 generates image data on the basis of the image values of the respective blocks (step S28). For example, the generation unit 127 may expand blocks of 4×4 pixels into two-dimensional data to generate image data.

The individual function units of the information processing apparatus 10 may be implemented by, for example, cloud computing provided by one or more computers.

Alternatively, the information processing apparatus 10 may be implemented by a plurality of devices. In this case, for example, the encoding processor 11 and the decoding processor 12 may be separate devices connected via a network or the like. In this case, for example, a terminal such as a smartphone may be provided with the encoding processor 11, and a network printer connected to the terminal via a network may be provided with the decoding processor 12 such that the terminal can encode a captured image and the network printer can decode and print the image.

Alternatively, for example, a network printer may be provided with the encoding processor 11, and a terminal such as a PC or a smartphone connected to the network printer via a network may be provided with the decoding processor 12 such that the network printer can encode a copied image and the terminal can decode the image and display the decoded image on a screen.

As described above, according to an embodiment of the present disclosure, if a variable-length code length, which is a data size for a block in a case where the block is encoded using variable-length coding, is greater than or equal to a threshold, the block is encoded using fixed-length coding. Accordingly, it is possible to appropriately encode the image. It is possible to reduce the expansion of the data size of the encoded data, which is caused because, for example, the data of the block to be encoded includes a value less likely to occur.

For example, an image copied by a copier (copying machine) is displayed on a terminal such as a PC to allow the user to check the image. In this case, it is desirable that a process for accumulating the copied image and a process for printing the image be performed in the same period. A typical image compression method, namely, Joint Photographic Experts Group (JPEG), uses variable-length coding, and the variable-length code length for each block is unknown until compression processing is actually performed. Therefore, the time taken for the encoding process of the image, the transfer time taken to transfer the encoded data, and the memory size for storing the encoded data are unknown. In addition, compression using fixed-length coding uses the data size of the same fixed length even for a blank sheet, for example, which may not be appropriate for storage in an HDD or the like.

According to an embodiment of the present disclosure, in contrast, since encoded data of each block has a data size less than or equal to the threshold, it is sufficient that the transfer rate of the memory or the bus satisfy a transfer rate less than or equal to the threshold. It is possible to reduce the transfer rate of the memory or the bus. It is also possible to reduce the cost of the memory or the bus, reduce heat generated by a circuit such as an ASIC, and save energy, for example.

While the present disclosure has been described with reference to an embodiment, the present disclosure is not limited to requirements given in the embodiment described above. In these respects, the present disclosure may be modified without departing from the spirit thereof; and may be defined as appropriate according to applications thereof.

Any one of the above-described operations may be performed in various other ways, for example, in an order different from the one described above.

Each of the functions of the described embodiments may be implemented by one or more processing circuits or circuits. Processing circuits includes a programmed processor, as a processor includes circuits. A processing circuits also includes devices such as an application specific integrated circuit (ASIC), a digital signal processor (DSP), a field programmable gate array (FPGA), and conventional circuit components arranged to perform the utilizing functions.

An information processing apparatus according to an embodiment of the present disclosure includes a reading unit configured to read first encoded data and second encoded data, the first encoded data being obtained by encoding a first block of an image using fixed-length coding, the second encoded data being obtained by encoding a second block of the image using variable-length coding; a decoding unit configured to decode the first block, based on the first encoded data, and to decode the second block, based on the second encoded data; and a generation unit configured to generate data of the image, based on data of the first block decoded by the decoding unit and data of the second block decoded by the decoding unit.

The information processing apparatus according to the embodiment of the present disclosure described above may further include an inverse quantization unit configured to inverse-quantize the data of the first block decoded by the decoding unit and the data of the second block decoded by the decoding unit; and a calculation unit configured to perform an inverse frequency transform of the data of the first block inverse-quantized by the inverse quantization unit and the data of the second block inverse-quantized by the inverse quantization unit to calculate pixel values. The generation unit generates the data of the image, based on the pixel values calculated by the calculation unit.

An information processing method according to an embodiment of the present disclosure includes reading first encoded data and second encoded data, the first encoded data being obtained by encoding a first block of an image using fixed-length coding, the second encoded data being obtained by encoding a second block of the image using variable-length coding; decoding the first block, based on the first encoded data; decoding the second block, based on the second encoded data; and generating data of the image, based on data of the decoded first block and data of the decoded second block.

The information processing method described above is implementable via a program stored in a recording medium.

The invention claimed is:

1. An information processing apparatus comprising:
circuitry configured to:
divide an image into a plurality of blocks;
calculate coefficients, in a frequency domain, based on values of pixels in each block of the plurality of blocks;
quantize the calculated coefficients;
calculate a data size for each block in a case where the quantized coefficients of each block are encoded using variable-length coding, based on a condition of an absolute value for each of the quantized coefficients of each block, and a combination of a header-code length and an additional-code length for each of the quantized coefficients of each block; and
determine whether the data size is equal to or greater than a threshold, wherein
the quantized coefficients of each block are encoded using fixed-length coding in a case where it is determined that the data size is equal to or greater than the threshold, and
the quantized coefficients of each block are encoded using variable-length coding in a case where it is determined that the data size is less than the threshold.

2. The information processing apparatus according to claim 1, wherein the threshold is a value determined by a data size for each block in a case where the quantized coefficients of each block are encoded using fixed-length coding.

3. The information processing apparatus according to claim 1, wherein the circuitry is configured to:
encode the quantized coefficients of each block for which the data size is equal to or greater than the threshold, using fixed-length coding;
encode another block using variable-length coding based on a determination that the data size is less than the threshold, the data size for the another block in a case where the another block is encoded using variable-length coding; and
generate encoded data of the image including encoded data of the quantized coefficients of each block encoded using fixed-length coding and encoded data of the another block encoded using variable-length coding.

4. The information processing apparatus according to claim 1, wherein the circuitry is configured to:
calculate the data size of each block based on data obtained by encoding the quantized coefficients of each block using variable-length coding.

5. The information processing apparatus according to claim 1, wherein the circuitry is configured to:
convert a format of each block from an RGB format in which color is represented as a combination of red, green, and blue, to a YUV format, in which color is represented as a combination of a luminance signal (Y), a difference (U) between the luminance signal and the blue component, and a difference (V) between the luminance signal and the red component;
perform frequency transform of the converted each block to calculate coefficients of frequency components for each block; and
quantize the coefficients of the frequency components of each block, wherein
the data size is determined based on the quantization of the coefficients of the frequency components of each block.

6. An information processing method performed by an information processing apparatus, the method comprising:
dividing an image into a plurality of blocks;
calculating coefficients, in a frequency domain, based on values of pixels in each of the plurality of blocks:
quantizing the calculated coefficients;
calculating a data size for each block in a case where the quantized coefficients of each block are encoded using variable-length coding, based on a condition of an absolute value for each of the quantized coefficients of each block, and a combination of a header-code length and an additional-code length for each of the quantized coefficients of each block;
determining whether the first data size is equal to or greater than a threshold;
encoding the quantized coefficients of each block using fixed-length coding in a case where it is determined that the data size is equal to or greater than the threshold; and
encoding the quantized coefficients of each block using variable-length coding in a case where it is determined that the data size is less than the threshold.

7. The information processing method according to claim 6, wherein the threshold is a value determined by a data size for each block in a case where the quantized coefficients of each block are encoded using fixed-length coding.

8. The information processing method according to claim 6, wherein the encoding includes:
encoding the quantized coefficients of each block for which data size is equal to or greater than the threshold, using fixed-length coding; and
encoding another block using variable-length coding based on a determination that the data size is less than the threshold, the data size for the another block in a case where the another block is encoded using variable-length coding, and
generating encoded data of the image including encoded data of the quantized coefficients of each block encoded using fixed-length coding in the encoding, and encoded data of the another block encoded using variable-length coding in the encoding.

9. The information processing method according to claim 6, further comprising:
calculating the data size of each block based on data obtained by encoding the quantized coefficients of each block using variable-length coding.

10. The information processing method according to claim 6, further comprising:
converting a format of each block from an RGB format in which color is represented as a combination of red, green, and blue, to a YUV format, in which color is represented as a combination of a luminance signal (Y), a difference (U) between the luminance signal and the blue component, and a difference (V) between the luminance signal and the red component;
performing frequency transform of the converted each block to calculate coefficients of frequency components for each block; and
quantizing the coefficients of the frequency components of each block, wherein
the data size is determined based on the quantization of the coefficients of the frequency components of each block.

11. A non-transitory recording medium storing a plurality of instructions which, when executed by one or more processors, cause the processors to perform an information processing method comprising:
dividing an image into a plurality of blocks;
calculating coefficients, in a frequency domain, based on values of pixels in each of the plurality of blocks;
quantizing the calculated coefficients;
calculating a data size for each block in a case where the quantized coefficients of each block are encoded using variable-length coding, based on a condition of an absolute value for each of the quantized coefficients of each block, and a combination of a header-code length and an additional-code length for each of the quantized coefficients of each block;
determining whether the data size is equal to or greater than a threshold;
encoding the quantized coefficients of each block using fixed-length coding in a case where it is determined that the data size is equal to or greater than the threshold; and
encoding the quantized coefficients of each block using variable-length coding in a case where it is determined that the data size is less than the threshold.

12. The non-transitory recording medium of claim 11, wherein the threshold is a value determined by a data size for each block in a case where the quantized coefficients of each block are encoded using fixed-length coding.

13. The non-transitory recording medium of claim 11, wherein the encoding includes:

encoding the quantized coefficients of each block for which the data size is equal to or greater than the threshold, using fixed-length coding; and encoding another block using variable-length coding based on a determination that the data size is less than the threshold, the data size for the another block in a case where the another block is encoded using variable-length coding, and generating encoded data of the image including encoded data of the quantized coefficients of each block encoded using fixed-length coding in the encoding, and encoded data of the another block encoded using variable-length coding in the encoding.

14. The non-transitory recording medium storing of claim 11, wherein the plurality of instructions further cause the processors to perform:

calculating the data size of each block based on data obtained by encoding the quantized coefficients of each block using variable-length coding.

15. The non-transitory recording medium storing of claim 11, wherein the plurality of instructions further cause the processors to perform:

converting a format of each block from an RGB format in which color is represented as a combination of red, green, and blue, to a YUV format, in which color is represented as a combination of a luminance signal (Y), a difference (U) between the luminance signal and the blue component, and a difference (V) between the luminance signal and the red component;

performing frequency transform of the converted each block to calculate coefficients of frequency components for each block; and quantizing the coefficients of the frequency components of each block, wherein the data size is determined based on the quantization of the coefficients of the frequency components of each block.

\* \* \* \* \*